Sept. 18, 1962  F. T. MELETIOU  3,054,115
BED PAN HOLDER
Filed Jan. 28, 1960

INVENTOR.
Frances T. Meletiou
BY Louis C. Smith

ATTORNEY

United States Patent Office 3,054,115
Patented Sept. 18, 1962

3,054,115
BED PAN HOLDER
Frances T. Meletiou, 166 Palmer St., Quincy, Mass.
Filed Jan. 28, 1960, Ser. No. 5,300
1 Claim. (Cl. 4—1)

This invention relates to a bed pan holder for holding a bed pan in proper position in a bed while it is being used.

When a patient confined to a bed desires bed pan service, the usual procedure is to place the bed pan in the bed on the bottom bed sheet and in the proper position for the use of the patient. It is desirable, of course, that during such use the bed pan should be firmly held from any sliding or displacing movement on the bed sheet. The smooth hard surface of the bottom of the bed pan and the smooth surface of the bottom bed sheet provide between them a relatively small resistance against any displacing movement of the bed pan relative to the sheet.

It is one object of the present invention to provide a novel bed pan holder which can be securely attached to the bottom surface of the bed pan and which has a bottom surface that is highly resistant to any slipping movement of said bed pan holder relative to the bottom sheet on which it is supported.

Another object of the invention is to provide a bed pan holder which is simple in construction and inexpensive to manufacture, which can be readily applied to any bed pan and which does not in any way interfere with the normal use of the bed pan.

A further object of the invention is to provide a novel bed pan holder having a body portion which is in the form of a thin, flexible sheet which will readily adapt itself to any uneven contour of the portion of the mattress on which the bed pan is supported.

A further object of the invention is to provide a bed pan holder of this type which can be very easily attached to the bottom of the bed pan and can also be easily detached therefrom.

In the drawings in which I have illustrated one embodiment of the invention,

Figure 1:
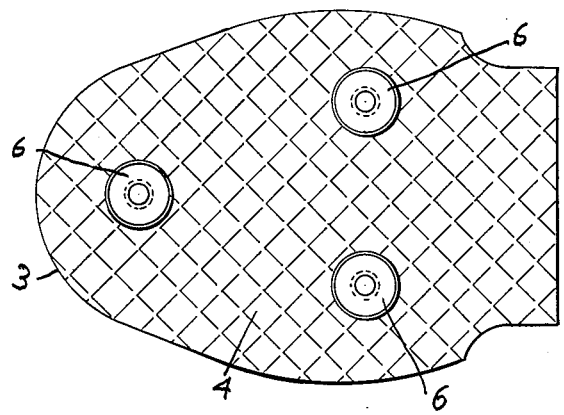
FIG. 1 is a top view of the bed pan holder.
Figure 2:
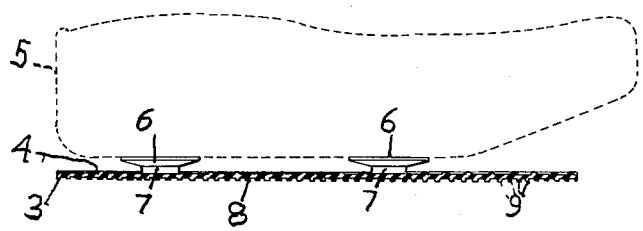
FIG. 2 is a side view thereof with the body shown in section.

In the drawings, the body of the bed pan holder is indicated at 3, and it is in the form of a flat, flexible, relatively thin sheet which has a shape and peripheral contour approximating the shape of the bed pan 5 (shown in dotted lines in FIG. 2) which is to be supported thereby. This body member 3 may be made of any suitable material, such as rubber or some rubber-like material, and it is flexible so that it will accommodate itself to any unevenness in the portion of the bed on which it is supported.

The top surface 4 of the body member 3 is provided with means by which said body can be firmly attached to the bottom face of a bed pan 5. While any suitable attaching means may be used, it is preferred to use the ordinary well-known suction cup 6 for this purpose. The suction cups 6 herein shown have a base portion 7 with a flat bottom face; and if both the suction cups 6 and the body member 3 are made of material which will respond to a vulcanizing operation, said suction cups can be readily vulcanized to the top surface of the body 3.

Any desired number of such suction cups may be used, but three suction cups will probably be all that is necessary. The use of three suction cups has the advantage that in any position of the body they can be arranged in a single plane.

The bed pan 5 can be easily attached to the body 3 by placing the latter on a flat surface and then mounting the bed pan on the suction cups and applying downward pressure to the bed pan, thus activating the suction cups to securely attach the bed pan to the body member.

Figure 3:
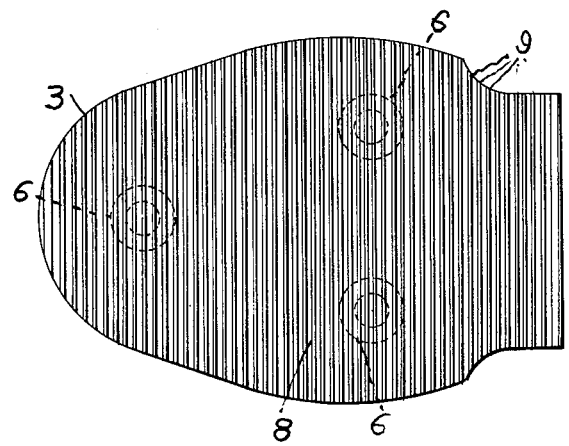
FIG. 3 is a bottom view of the bed pan holder.
Figure 4:
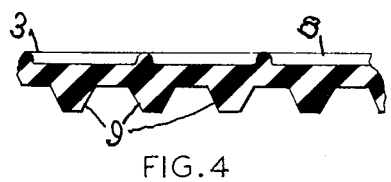
FIG. 4 is an enlarged fragmentary sectional view of a portion of the body member.

The bottom face 8 of the body member is constructed to provide resistance against sliding movement of said body member on any surface on which it may be supported such as the smooth surface of the bottom bed sheet. This is accomplished by making said bottom face of the body member 3 with ribs or corrugations 9 preferably extending transversely of the body member as shown in FIG. 3. If the body member is made of a sheet of rubber, then these corrugations can be formed in the bottom face of the body by a molding process, although they may be made in any other way without departing from the invention.

The bed pan holder herein shown has a relatively small vertical dimension; and, hence, when it is applied to a bed pan and the bed pan is being used, the bottom face of the bed pan is situated only a slight distance above the bed sheet on which the bed pan holder is mounted.

With this construction, the bed pan itself will be held firmly against any lateral movement relative to the bed pan holder because of the action of the suction cups 6, and the character of the bottom face of the body member 3 is such that the contact of said bottom face with the lower bed sheet or any other piece of bed clothing wil provide a high resistance against any sliding movement of the bed pan holder relative to the sheet on which it is supported.

The bed pan holder herein described is especially useful in case it is used in a bed in which the top end of the mattress has been raised slightly so that the mattress has an inclined position from the top to the bottom. When used under these circumstances, the bed pan will be secured or maintained in its proper position and there will still be no sliding or shifting movement of the bed pan holder and bed pan relative to the bottom bed sheet on which it is supported.

It will also be noted that the bed pan holder herein described need not be detached from the bed pan when the bed pan is not being used by the patient. Rather the holder may be left attached to the bed pan to prevent it from slipping off of the bed, table, chair, or other object on which it is placed when not in use, thereby preventing the bed pan from falling to the floor or spilling.

I claim:

A bed pan holder comprising a flexible body member, a lower surface on said body member, means on said lower surface for preventing the slippage of said body member with respect to surfaces upon which said body member is placed, an upper surface on said body member, a first rigid cylindrical base member secured to said body member with its principal axis normal thereto, a second rigid cylindrical base member secured to said upper surface of said body member with its principal axis normal thereto, a third rigid cylindrical base member secured to said upper surface of said body member with its principal axis normal thereto, a first suction cup secured to the top of said first base member with its principal axis coaxial with the principal axis of said base member, a second suction cup secured to the top of said second base member with its principal axis coaxial with the principal axis of said base member, and a third suction cup secured to the top of said third base member with its principal axis coaxial with the principal axis of said third base member whereby a bed pan holder is provided having three suction cups to be attached to the undersurface of a bed pan which suction cups are spaced away from a flexible body member to prevent irregularities in the surface upon which the said body member rests to cause said suction cups to become distorted with respect to said bed pan and thereby to become disengaged therefrom.

References Cited in the file of this patent

UNITED STATES PATENTS

| | | |
|---|---|---|
| D. 85,859 | Capouch | Dec. 29, 1931 |
| 1,201,256 | Clarke | Oct. 17, 1916 |
| 1,534,214 | Holt | Apr. 21, 1925 |
| 2,081,992 | Gavlak | June 1, 1937 |
| 2,619,653 | Young | Dec. 2, 1952 |